US012132444B2

(12) United States Patent
Ma et al.

(10) Patent No.: US 12,132,444 B2
(45) Date of Patent: Oct. 29, 2024

(54) PHOTOVOLTAIC SYSTEM, PHOTOVOLTAIC UNIT GROUPING METHOD, COMPUTING DEVICE, AND STORAGE MEDIUM

(71) Applicant: Huawei Digital Power Technologies Co., Ltd., Shenzhen (CN)

(72) Inventors: Xun Ma, Dongguan (CN); Yu Sun, Shenzhen (CN); Yixuan Lv, Beijing (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/883,744

(22) Filed: Aug. 9, 2022

(65) Prior Publication Data

US 2022/0393642 A1 Dec. 8, 2022

Related U.S. Application Data

(63) Continuation of application No. PCT/CN2021/080077, filed on Mar. 10, 2021.

(30) Foreign Application Priority Data

Mar. 17, 2020 (CN) .......................... 202010186543.2

(51) Int. Cl.
*H02S 50/10* (2014.01)
*H02S 40/32* (2014.01)
(Continued)

(52) U.S. Cl.
CPC .............. *H02S 50/10* (2014.12); *H02S 40/32* (2014.12); *H02S 40/36* (2014.12); *H04B 3/48* (2013.01)

(58) Field of Classification Search
CPC .......... H02S 50/10; H02S 40/32; H02S 40/36; H02S 50/00; H02S 40/30; H04B 3/48;
(Continued)

(56) References Cited

U.S. PATENT DOCUMENTS

| 2010/0198424 | A1 | 8/2010 | Takehara et al. |
| 2011/0156834 | A1* | 6/2011 | Bellantoni ............. H03G 11/02 333/17.2 |

(Continued)

FOREIGN PATENT DOCUMENTS

| CN | 105471628 A | 4/2016 |
| CN | 108494642 A | 9/2018 |

(Continued)

*Primary Examiner* — Michael Y Sun
(74) *Attorney, Agent, or Firm* — WOMBLE BOND DICKINSON (US) LLP

(57) ABSTRACT

A photovoltaic system includes an inverter and a plurality of photovoltaic units connected to the inverter. Each photovoltaic unit includes a controller and one or more photovoltaic modules connected to the controller. The controller in each photovoltaic unit is further configured to obtain a power carrier signal sent by a controller in another photovoltaic unit of the plurality of photovoltaic units, determine an attenuation reference factor of the power carrier signal based on the obtained power carrier signal, and send the attenuation reference factor to the inverter. The inverter is further configured to group the plurality of photovoltaic units based on the attenuation degree of the power carrier signal obtained by each photovoltaic unit. This application can implement automatic grouping of photovoltaic units.

5 Claims, 3 Drawing Sheets

(51) Int. Cl.
*H02S 40/36* (2014.01)
*H04B 3/48* (2015.01)

(58) Field of Classification Search
CPC ........ H04B 3/54; H02J 2300/24; H02J 1/084; H02J 13/00007; Y02E 40/70; Y04S 10/123
See application file for complete search history.

(56) References Cited

U.S. PATENT DOCUMENTS

| | | | |
|---|---|---|---|
| 2018/0226804 A1 | 8/2018 | Eda et al. | |
| 2019/0113900 A1* | 4/2019 | Yoscovich | G05B 19/042 |
| 2020/0213929 A1 | 7/2020 | Edwards et al. | |

FOREIGN PATENT DOCUMENTS

| | | |
|---|---|---|
| CN | 109194686 A | 1/2019 |
| CN | 109391223 A | 2/2019 |
| CN | 210007670 U | 1/2020 |
| CN | 111404480 A | 7/2020 |
| EP | 2299497 A1 | 3/2011 |
| EP | 3334036 A1 | 6/2018 |

\* cited by examiner

PHOTOVOLTAIC SYSTEM, PHOTOVOLTAIC UNIT GROUPING METHOD, COMPUTING DEVICE, AND STORAGE MEDIUM

CROSS-REFERENCE TO RELATED APPLICATIONS

This application is a continuation of International Application No. PCT/CN2021/080077, filed on Mar. 10, 2021, which claims priority to Chinese Patent Application No. 202010186543.2, filed on Mar. 17, 2020. The disclosures of the aforementioned applications are hereby incorporated by reference in their entireties.

TECHNICAL FIELD

This application relates to the field of photovoltaic technologies, and in particular, to a photovoltaic system, a photovoltaic unit grouping method, a computing device, and a storage medium.

BACKGROUND

A photovoltaic system is configured to convert radiant energy of sunlight into electrical energy. The photovoltaic system includes an inverter and a plurality of photovoltaic units. The photovoltaic unit includes a controller, several photovoltaic modules, and the like. The controller is configured to regulate at least one of an output voltage and an output current of the photovoltaic module. For example, the controller is configured to regulate a voltage of a direct current that is output by the photovoltaic module. The plurality of photovoltaic units may be divided into a plurality of photovoltaic unit groups based on a deployment mode of the photovoltaic system. In addition, after installation of the photovoltaic system is completed, information used to represent the deployment mode of the photovoltaic system may further be input to the inverter. For example, information about photovoltaic units included in each photovoltaic unit group is input to the inverter, so that the inverter manages the photovoltaic units in different photovoltaic unit groups based on the information.

In a related technology, a deployment mode of a photovoltaic system is usually determined manually, and then serial numbers of controllers in photovoltaic units included in each photovoltaic unit group are manually input to an inverter. A process of determining the photovoltaic units included in each photovoltaic unit group and inputting the serial numbers in the photovoltaic units included in each photovoltaic unit group to the inverter is referred to as a photovoltaic unit grouping process.

However, this grouping manner is relatively low in efficiency and is prone to errors. Therefore, it is of great significance to provide a solution for automatically grouping photovoltaic units.

SUMMARY

This application provides a photovoltaic system, a photovoltaic unit grouping method, a computing device, and a storage medium, which can resolve the problem that the grouping manner in the related technology is relatively low in efficiency and is prone to errors. Technical solutions provided in this application are as follows:

According to a first aspect, this application provides a photovoltaic system. The photovoltaic system includes an inverter and a plurality of photovoltaic units connected to the inverter. Each photovoltaic unit includes a controller and one or more photovoltaic modules connected to the controller. The photovoltaic module is configured to convert radiant energy of sunlight into a direct current. The controller is configured to regulate an output status of the one or more photovoltaic modules. The inverter is configured to convert the direct current that is output by the photovoltaic unit into an alternating current and output the alternating current. In addition, the controller in each photovoltaic unit is further configured to obtain a power carrier signal sent by a controller in another photovoltaic unit of the plurality of photovoltaic units, determine an attenuation reference factor of the power carrier signal based on the obtained power carrier signal, and send the attenuation reference factor to the inverter. The inverter is further configured to determine, based on the attenuation reference factor, an attenuation degree of the power carrier signal obtained by the controller in each photovoltaic unit, and group the plurality of photovoltaic units based on the attenuation degree of the power carrier signal obtained by each photovoltaic unit.

The power carrier signal carries identification information of the controller that sends the power carrier signal, and the attenuation reference factor is used to reflect an attenuation degree of signal attenuation of the power carrier signal in a process of being transmitted, to the controller in the photovoltaic unit, from the controller that is in the another photovoltaic unit and that is indicated by the identification information in the power carrier signal.

An attenuation reference factor of each power carrier signal transmitted between controllers in different photovoltaic units in the photovoltaic system is obtained, and the attenuation degree of the power carrier signal obtained by the controller in each photovoltaic unit is determined based on the attenuation reference factor. The plurality of photovoltaic units are grouped based on the attenuation degree of the power carrier signal obtained by each photovoltaic unit. Compared with a related technology, this can implement automatic grouping of the photovoltaic units, and can effectively improve efficiency in grouping the photovoltaic units and improve grouping accuracy, thereby improving operation and maintenance efficiency of the photovoltaic system.

In a possible embodiment, a power carrier signal transmitted between controllers in a plurality of photovoltaic units in a same photovoltaic unit group has a relatively small attenuation degree. Therefore, when the inverter is configured to group the plurality of photovoltaic units based on the attenuation degree of the power carrier signal obtained by each photovoltaic unit, the inverter is configured to: when an attenuation degree of a power carrier signal that is obtained by a controller in a photovoltaic unit and that is sent by a controller in another photovoltaic unit is less than or equal to a reference threshold, determine that the photovoltaic unit and the another photovoltaic unit belong to a same photovoltaic unit group.

In some embodiments, when the inverter is configured to group the plurality of photovoltaic units based on the attenuation degree of the power carrier signal obtained by each photovoltaic unit, the inverter is further configured to: sort attenuation degrees of power carrier signals that are obtained by controllers in a plurality of photovoltaic units and that are sent by a controller in a same another photovoltaic unit, or sort attenuation degrees of power carrier signals that are obtained by a controller in a same photovoltaic unit and that are sent by controllers in a plurality of other photovoltaic units; and determine the reference threshold based on a distribution status presented by the plurality of attenuation degrees after the sorting.

Attenuation degrees corresponding to controllers in different photovoltaic units are sorted, and the reference threshold is determined based on a result of the sorting. In this way, the reference threshold can be dynamically determined based on an actual deployment mode of the photovoltaic units in the photovoltaic system, thereby making the reference threshold more recognizable in grouping and improving accuracy in grouping the photovoltaic units based on the reference threshold.

In some embodiments, the attenuation reference factor includes one or more of the following: a signal strength, and a line impedance for transmitting the power carrier signal.

In some embodiments, the power carrier signal that is obtained by the controller in the photovoltaic unit and that is sent by the controller in the another photovoltaic unit includes at least one of the following: a power carrier signal that is sent by the controller in the another photovoltaic unit to the inverter and that is obtained through listening by the controller in the photovoltaic unit; a power carrier signal broadcast by the controller in the another photovoltaic unit; and a power carrier signal that is sent by the controller in the another photovoltaic unit to the controller in the photovoltaic unit.

In some embodiments, frequency bands used by different photovoltaic units for sending signals may be the same or different. In addition, a frequency band used for sending a signal may be a frequency band used by a photovoltaic unit for sending a service signal with the inverter, for example, may be 75 kilohertz (kHz) to 145 kHz. Alternatively, the frequency band may be a frequency band other than the frequency band used for sending a service signal, for example, may be 280 kHz to 300 kHz. This is not specifically limited in this embodiment of this application.

Further, when a plurality of other photovoltaic units exist, a sequence in which the plurality of other photovoltaic units send signals successively may be determined based on an actual need. For example, a logical address may be allocated in advance to each photovoltaic unit in the photovoltaic system. In this case, the plurality of other photovoltaic units may send signals in sequence based on the logical addresses of the photovoltaic units in ascending order of the logical addresses.

According to a second aspect, this application provides a photovoltaic unit grouping method. The method is applied to a photovoltaic system. The photovoltaic system includes an inverter and a plurality of photovoltaic units connected to the inverter. The photovoltaic unit includes a controller and one or more photovoltaic modules connected to the controller, and the controller is configured to regulate an output status of the one or more photovoltaic modules. The method includes: obtaining an attenuation reference factor of each power carrier signal transmitted between controllers in different photovoltaic units in the photovoltaic system, where the power carrier signal carries identification information of a controller that sends the power carrier signal, and the attenuation reference factor is used to reflect an attenuation degree of signal attenuation of the power carrier signal in a process of being transmitted, to a controller in a photovoltaic unit, from the controller that is in another photovoltaic unit and that is indicated by the identification information in the power carrier signal; determining, based on the attenuation reference factor, an attenuation degree of a power carrier signal obtained by the controller in each photovoltaic unit; and grouping the plurality of photovoltaic units based on the attenuation degree of the power carrier signal obtained by each photovoltaic unit.

In some embodiments, the grouping the plurality of photovoltaic units based on the attenuation degree of the power carrier signal obtained by each photovoltaic unit includes: when an attenuation degree of a power carrier signal that is obtained by a controller in a photovoltaic unit and that is sent by a controller in another photovoltaic unit is less than or equal to a reference threshold, determining that the photovoltaic unit and the another photovoltaic unit belong to a same photovoltaic unit group.

In some embodiments, the grouping the plurality of photovoltaic units based on the attenuation degree of the power carrier signal obtained by each photovoltaic unit further includes: sorting attenuation degrees of power carrier signals that are obtained by controllers in a plurality of photovoltaic units and that are sent by a controller in a same another photovoltaic unit, or sorting attenuation degrees of power carrier signals that are obtained by a controller in a same photovoltaic unit and that are sent by controllers in a plurality of other photovoltaic units; and determining the reference threshold based on a distribution status presented by the plurality of attenuation degrees after the sorting.

In some embodiments, the attenuation reference factor includes one or more of the following: a signal strength, and a line impedance for transmitting the power carrier signal.

In some embodiments, the power carrier signal that is obtained by the controller in the photovoltaic unit and that is sent by the controller in the another photovoltaic unit includes at least one of the following: a power carrier signal that is sent by the controller in the another photovoltaic unit to the inverter and that is obtained through listening by the controller in the photovoltaic unit; a power carrier signal broadcast by the controller in the another photovoltaic unit; and a power carrier signal that is sent by the controller in the another photovoltaic unit to the controller in the photovoltaic unit.

According to a third aspect, this application provides a photovoltaic unit grouping apparatus. The photovoltaic unit grouping apparatus may include: an obtaining module, configured to obtain an attenuation reference factor of each power carrier signal transmitted between controllers in different photovoltaic units in a photovoltaic system, where the power carrier signal carries identification information of a controller that sends the power carrier signal, and the attenuation reference factor is used to reflect an attenuation degree of signal attenuation of the power carrier signal in a process of being transmitted, to a controller in a photovoltaic unit, from the controller that is in another photovoltaic unit and that is indicated by the identification information in the power carrier signal; a determining module, configured to determine, based on the attenuation reference factor, an attenuation degree of a power carrier signal obtained by a controller in each photovoltaic unit; and a grouping module, configured to group a plurality of photovoltaic units based on the attenuation degree of the power carrier signal obtained by each photovoltaic unit.

In some embodiments, the grouping module is configured to: when an attenuation degree of a power carrier signal that is obtained by a controller in a photovoltaic unit and that is sent by a controller in another photovoltaic unit is less than or equal to a reference threshold, determine that the photovoltaic unit and the another photovoltaic unit belong to a same photovoltaic unit group.

In some embodiments, the grouping module is further configured to sort attenuation degrees of power carrier signals that are obtained by controllers in a plurality of photovoltaic units and that are sent by a controller in a same another photovoltaic unit, or sort attenuation degrees of power carrier signals that are obtained by a controller in a same photovoltaic unit and that are sent by controllers in a plurality of other photovoltaic units; and determine the reference threshold based on a distribution status presented by the plurality of attenuation degrees after the sorting.

In some embodiments, the attenuation reference factor includes one or more of the following: a signal strength, and a line impedance for transmitting the power carrier signal.

In some embodiments, the power carrier signal that is obtained by the controller in the photovoltaic unit and that is sent by the controller in the another photovoltaic unit includes at least one of the following: a power carrier signal that is sent by the controller in the another photovoltaic unit to the inverter and that is obtained through listening by the controller in the photovoltaic unit; a power carrier signal broadcast by the controller in the another photovoltaic unit; and a power carrier signal that is sent by the controller in the another photovoltaic unit to the controller in the photovoltaic unit.

According to a fourth aspect, this application provides a computing device, including a processor and a memory. The memory stores a computer program. When the processor executes the computer program, the computing device implements the photovoltaic unit grouping method according to the second aspect.

According to a fifth aspect, this application provides a storage medium. When instructions in the storage medium are executed by a processor, the photovoltaic unit grouping method according to the second aspect is implemented.

According to a sixth aspect, this application provides a computer program product. When the computer program product runs on a computing device, the computing device is enabled to perform the photovoltaic unit grouping method according to the second aspect.

DESCRIPTION OF EMBODIMENTS

To make objectives, technical solutions, and advantages of this application clearer, the following further describes embodiments of this application in detail with reference to accompanying drawings.

Figure 1:
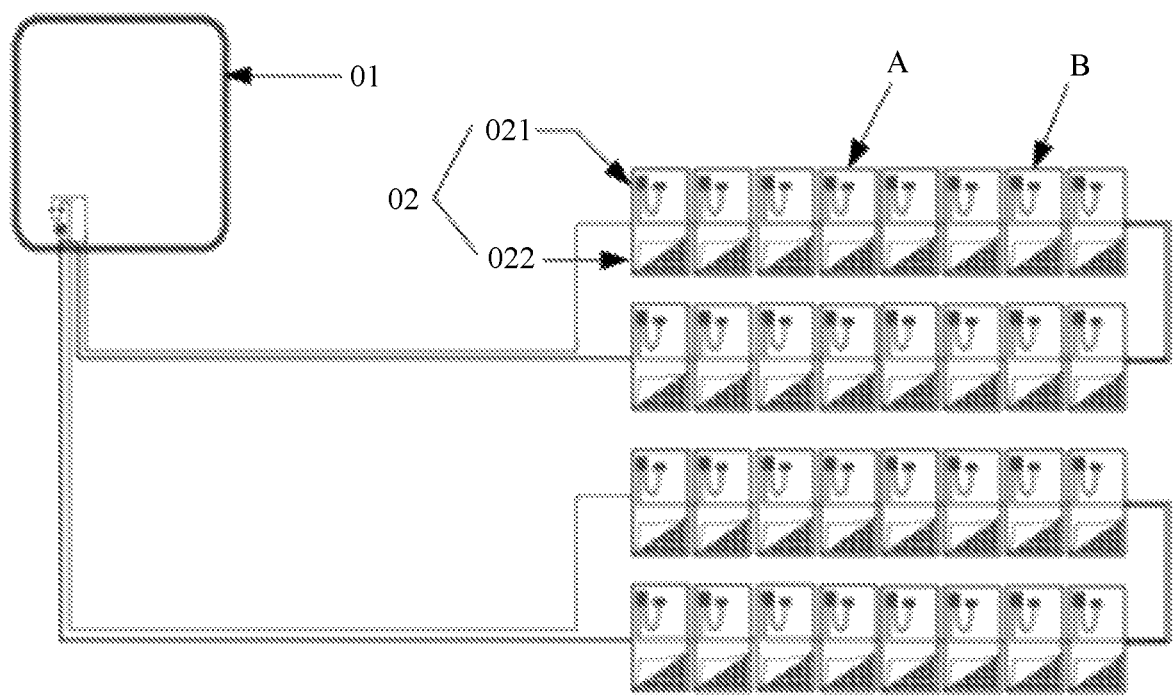
FIG. 1 is a schematic diagram of an example environment related to a photovoltaic unit grouping method according to an embodiment of this application.

FIG. 1 is a schematic diagram of a photovoltaic system according to an embodiment of this application. The photovoltaic system is configured to convert radiant energy of sunlight into electrical energy. As shown in FIG. 1, the photovoltaic system may include an inverter 01 and a plurality of photovoltaic units 02 connected to the inverter 01. The inverter 01 is configured to convert a direct current output by the photovoltaic unit 02 into an alternating current and output the alternating current. Each photovoltaic unit 02 includes a controller 021 and one or more photovoltaic modules (also referred to as photovoltaic panels) 022 connected to the controller 021. The photovoltaic module 022 is configured to convert radiant energy of sunlight into a direct current. The controller 021 is configured to regulate an output status of the one or more photovoltaic modules 022.

In a possible embodiment, the photovoltaic module 022 may be a photovoltaic (PV) cell or a photovoltaic panel. In some embodiments, the controller 021 may have one or more of the following functions: adjusting an output power of the photovoltaic module 022 (in this case, the controller may also be referred to as an optimizer), controlling the photovoltaic module 022 to start or stop output (in this case, the controller may also be referred to as a shutdown module), and monitoring an output status of the photovoltaic module 022 (in this case, the controller may also be referred to as a monitor). For example, the controller 021 may regulate a voltage amplitude, a current amplitude, and the like of the direct current output by the photovoltaic module 022, to enable an output power of the photovoltaic module 022 to reach a maximum power, thereby improving utilization of the photovoltaic module 022.

The controller 021 in each photovoltaic unit 02 is connected to the inverter 01, and each photovoltaic module 022 is connected to the controller 021. In a possible embodiment, the controller 021 and the inverter 01 may be connected by using a power line. In other words, power line communication (PLC) may be performed between the controller 021 and the inverter 01. PLC may be performed between the inverter 01 and the controller 021, to perform information exchange operations such as service querying and command control. In addition, in a communication process, the inverter 01 may be referred to as a PLC host, which is also referred to as a central coordinator (CCO); and the controller 021 may be referred to as a PLC slave, which is also referred to as a station (STA). A connection mentioned in this embodiment of this application may include a direct connection, an indirect connection, or other embodiments. This is not specifically limited in this embodiment of this application.

In some embodiments, the photovoltaic unit 02 may further include a shutdown module (not illustrated in FIG. 1). The shutdown module is configured to connect or disconnect a connection between an output end of the photovoltaic module 022 and the inverter 01.

In addition, as shown in FIG. 1, the plurality of photovoltaic units 02 of the photovoltaic system may be divided into a plurality of photovoltaic unit groups based on a deployment mode of the photovoltaic system. A plurality of photovoltaic units 02 in a same photovoltaic unit group are connected in series to form a direct-current high voltage string. The direct-current high voltage string is connected to the inverter 01. The inverter 01 is configured to convert a direct current output by the photovoltaic unit 02 into an alternating current and output the alternating current to a power grid.

Usually, after installation of the photovoltaic system is completed, information used to represent the deployment mode of the photovoltaic system may further be input to the inverter 01. For example, information about photovoltaic units 02 included in each photovoltaic unit group is input to the inverter 01, so that the inverter 01 manages the photovoltaic units 02 by photovoltaic unit group based on the information.

In a related technology, a deployment mode of a photovoltaic system is usually determined manually, and serial numbers of controllers in photovoltaic units included in each photovoltaic unit group are manually input to an inverter. However, this grouping manner is relatively low in efficiency and is prone to errors.

This embodiment of this application provides the photovoltaic system. In this photovoltaic system, the controller 021 in each photovoltaic unit 02 is further configured to obtain a power carrier signal sent by a controller 021 in another photovoltaic unit 02 of the plurality of photovoltaic units 02, determine an attenuation reference factor of the power carrier signal based on the obtained power carrier signal, and send the attenuation reference factor to the inverter 01. The inverter 01 is further configured to determine, based on the attenuation reference factor, an attenuation degree of the power carrier signal obtained by the controller 021 in each photovoltaic unit 02, and group the plurality of photovoltaic units 02 based on the attenuation degree of the power carrier signal obtained by each photovoltaic unit 02.

The power carrier signal carries identification information of the controller 021 that sends the power carrier signal, and the attenuation reference factor is used to reflect an attenuation degree of signal attenuation of the power carrier signal in a process of being transmitted, to the controller 021 in the photovoltaic unit 02, from the controller 021 that is in the another photovoltaic unit 02 and that is indicated by the identification information in the power carrier signal.

It can be learned from the above that the photovoltaic system can implement automatic grouping of the photovoltaic units 02. Compared with the related technology, this can effectively improve efficiency in grouping the photovoltaic units 02 and improve grouping accuracy.

In a possible embodiment, when the inverter 01 is configured to group the plurality of photovoltaic units 02 based on the attenuation degree of the power carrier signal obtained by each photovoltaic unit 02, the inverter 01 is configured to: when an attenuation degree of a power carrier signal that is obtained by a controller 021 in a photovoltaic unit 02 and that is sent by a controller 021 in another photovoltaic unit 02 is less than or equal to a reference threshold, determine that the photovoltaic unit 02 and the another photovoltaic unit 02 belong to a same photovoltaic unit group.

In addition, the reference threshold may be specified based on a factor such as actual experience, or may be dynamically determined based on an actual deployment status of the photovoltaic units 02. For example, when the inverter 01 is configured to group the plurality of photovoltaic units 02 based on the attenuation degree of the power carrier signal obtained by each photovoltaic unit 02, the inverter 01 is further configured to: sort attenuation degrees of power carrier signals that are obtained by controllers 021 in a plurality of photovoltaic units 02 and that are sent by a controller 021 in a same another photovoltaic unit 02, or sort attenuation degrees of power carrier signals that are obtained by a controller 021 in a same photovoltaic unit 02 and that are sent by controllers 021 in a plurality of other photovoltaic units 02; and determine the reference threshold based on a distribution status presented by the plurality of attenuation degrees after the sorting.

Attenuation degrees corresponding to a plurality of other photovoltaic units 02 are sorted, and the reference threshold is determined based on a result of the sorting. In this way, the reference threshold can be dynamically determined based on an actual deployment mode of the photovoltaic units 02 in the photovoltaic system, thereby making the reference threshold more recognizable in grouping and improving accuracy in grouping the photovoltaic units 02 based on the reference threshold.

In some embodiments, the attenuation reference factor includes one or more of the following: a signal strength, and a line impedance for transmitting the power carrier signal.

The power carrier signal that is obtained by a controller 021 in a photovoltaic unit 02 and that is sent by a controller 021 in another photovoltaic unit 02 includes at least one of the following: a power carrier signal that is sent by the controller 021 in the another photovoltaic unit 02 to the inverter 01 and that is obtained through listening by the photovoltaic unit 02; a power carrier signal broadcast by the another photovoltaic unit 02; and a power carrier signal that is sent by the another photovoltaic unit 02 to the photovoltaic unit 02.

In some embodiments, frequency bands used by different photovoltaic units 02 for sending signals may be the same or different. In addition, a frequency band used for sending a signal may be a frequency band used by a photovoltaic unit 02 for sending a service signal with the inverter 01, for example, may be 75 kilohertz (kHz) to 145 kHz. Alternatively, the frequency band may be a frequency band other than the frequency band used for sending a service signal, for example, may be 280 kHz to 300 kHz. This is not specifically limited in this embodiment of this application.

Further, when a plurality of other photovoltaic units 02 exist, a sequence in which the plurality of other photovoltaic units 02 send signals successively may be determined based on an actual need. For example, a logical address may be allocated in advance to each photovoltaic unit 02 in the photovoltaic system. In this case, the plurality of other photovoltaic units 02 may send signals in sequence based on the logical addresses of the photovoltaic units 02 in ascending order of the logical addresses.

It should be noted that the operation of the inverter 01 for determining, based on the attenuation reference factor, the attenuation degree of the power carrier signal obtained by the controller 021 in each photovoltaic unit 02, and grouping the plurality of photovoltaic units 02 based on the attenuation degree of the power carrier signal obtained by each photovoltaic unit 02 may alternatively be performed by any controller 021 in the photovoltaic system. In this case, a controller 021 in another photovoltaic unit 02 may send an attenuation reference factor of a power carrier signal obtained by the controller 021 to the any controller 021, so that the any controller 021 groups the plurality of photovoltaic units 02 in the photovoltaic system based on the attenuation reference factor.

In addition, the process in the foregoing embodiment in which the inverter 01 groups the photovoltaic units 02 based on attenuation degrees of power carrier signals transmitted between different photovoltaic units 02 is merely an example of a process of a method for grouping photovoltaic units 02 that is provided in the embodiments of this application, but does not exclude that the method for grouping photovoltaic units 02 that is provided in the embodiments of this application has other embodiments. For example, an execution body of the method for grouping photovoltaic units 02 may alternatively be a controller 021 in a photovoltaic unit 02. In this case, the controller 021 may obtain attenuation degrees of power carrier signals transmitted between the controller 021 and controllers 021 in other photovoltaic units 02, sort the plurality of attenuation degrees, and then determine, based on a result of the sorting, a photovoltaic unit group to which the photovoltaic unit 02 belongs. Alternatively, the controller 021 may obtain an attenuation degree of a power carrier signal transmitted between a controller 021 in another photovoltaic unit 02 and a controller 021 in each of a plurality of other photovoltaic units 02; and then determine, in combination with a result of sorting a plurality of attenuation degrees corresponding to the another photovoltaic unit 02, a photovoltaic unit group to which the photovoltaic unit 02 and the another photovoltaic unit 02 belong.

Further, as shown in FIG. 1, based on the deployment mode of the photovoltaic system, a plurality of photovoltaic units 02 in each photovoltaic unit group are connected in series. In addition, in a same photovoltaic unit group, when more photovoltaic units 02 are connected between two photovoltaic units 02, an attenuation degree of a power carrier signal received by one of the two photovoltaic units 02 from the other photovoltaic unit 02 increases. Therefore, if the foregoing grouping process (for a specific process, refer to the following operation 201 to operation 206) is to be performed on some photovoltaic units 02 of the plurality of photovoltaic units 02, the some photovoltaic units 02 may be photovoltaic units 02, in each photovoltaic unit group, located relatively near to a photovoltaic unit connected in series at a middlemost position between a plurality of photovoltaic units 02 in the photovoltaic unit group. In this way, obtained attenuation degrees of power carrier signals between different photovoltaic units 02 in a same photovoltaic unit group have better aggregation, and obtained attenuation degrees of power carrier signals between photovoltaic units 02 in different photovoltaic unit groups have better dispersion. When the attenuation degrees are sorted and groups of photovoltaic units 02 are determined based on a resulting of the sorting, grouping accuracy can be further improved. For example, as shown in FIG. 1, compared with performing the foregoing grouping process on a photovoltaic unit 02A, performing the foregoing grouping process on a photovoltaic unit 02B can further improve grouping accuracy.

Figure 2:
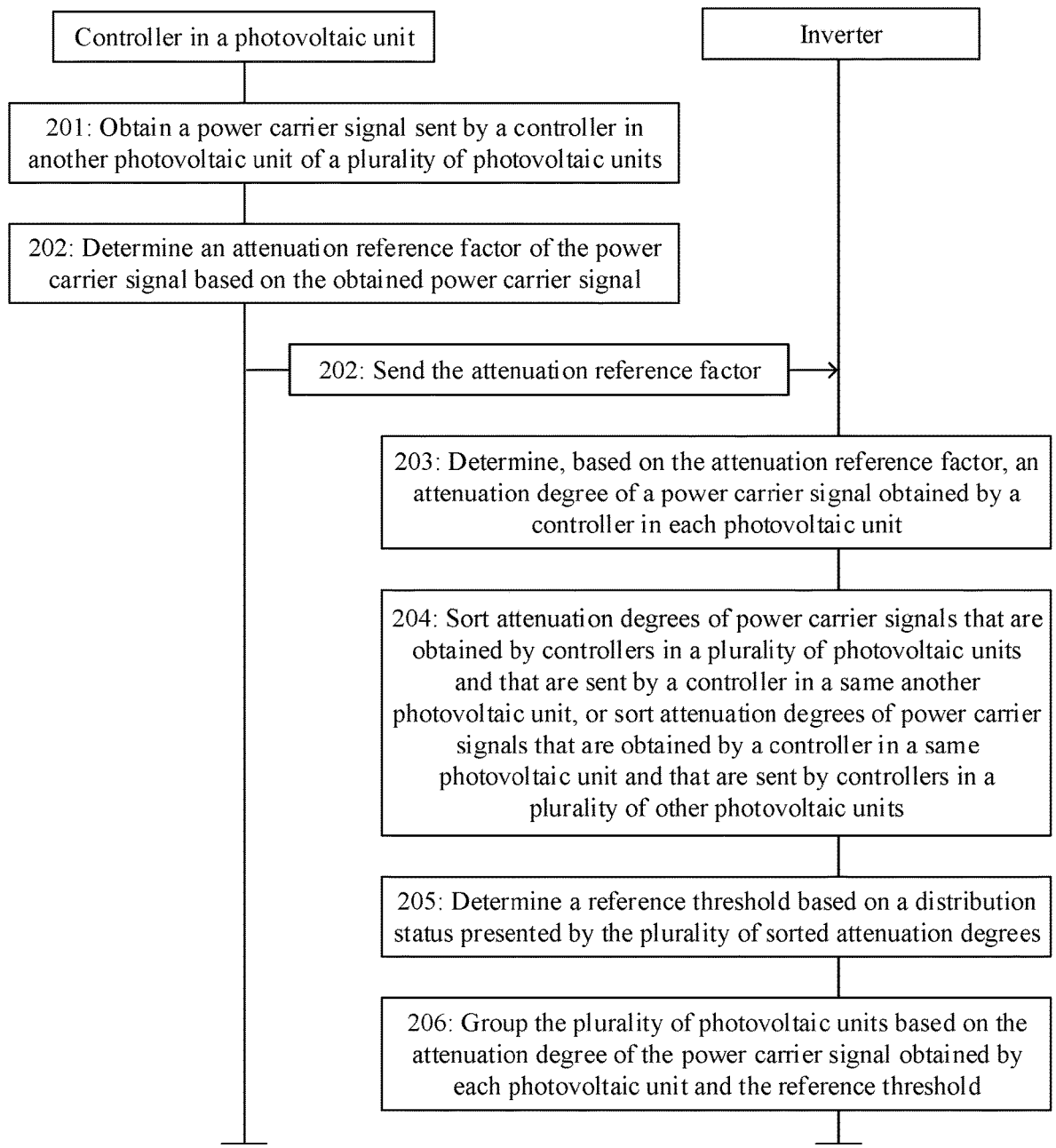
FIG. 2 is a flowchart of a photovoltaic unit grouping method according to an embodiment of this application.

The following describes a process of a method for grouping photovoltaic units by a photovoltaic system provided in an embodiment of this application. For a working process of each component in the photovoltaic system, correspondingly refer to a working process of a corresponding component in the method embodiment. FIG. 2 is a flowchart of a photovoltaic unit grouping method according to an embodiment of this application. As shown in FIG. 2, the method may include the following operations.

Operation 201: A controller in a photovoltaic unit obtains a power carrier signal sent by a controller in another photovoltaic unit in a plurality of photovoltaic units.

There may be a plurality of embodiments for the controller in the photovoltaic unit to obtain the power carrier signal sent by the controller in the another photovoltaic unit. This embodiment of this application is described by using the following several possible embodiments as examples.

In a possible embodiment, the controller in the photovoltaic unit has a function of listening to a power carrier signal. In this case, the power carrier signal that is obtained by the controller in the photovoltaic unit and that is sent by the controller in the another photovoltaic unit may be a power carrier signal that is sent by the controller in the another photovoltaic unit to another component (for example, an inverter or a controller in a photovoltaic unit different from the another photovoltaic unit) and that is obtained through listening by the controller in the photovoltaic unit. For example, the controller in the photovoltaic unit and controllers in a plurality of other photovoltaic units are all connected to the inverter. Therefore, the power carrier signal that is obtained by the controller in the photovoltaic unit and that is sent by the controller in the another photovoltaic unit may be a power carrier signal that is sent by the controller in the another photovoltaic unit to the inverter and that is obtained through listening by the controller in the photovoltaic unit.

In another possible embodiment, controllers in photovoltaic units each may transmit a power carrier signal to a power line in sequence in a broadcast manner. In this case, the power carrier signal that is obtained by the controller in the photovoltaic unit and that is sent by the controller in the another photovoltaic unit may be a power carrier signal broadcast by the controller in the another photovoltaic unit.

In still another possible embodiment, based on a deployment mode of the photovoltaic system, the controller in the another photovoltaic unit may directly or indirectly send a power carrier signal to the controller in the photovoltaic unit. In this case, the power carrier signal that is obtained by the controller in the photovoltaic unit and that is sent by the controller in the another photovoltaic unit may be a power carrier signal sent by the controller in the another photovoltaic unit to the controller in the photovoltaic unit.

In addition, the power carrier signal may carry identification information of the controller that sends the power carrier signal, so that a receive end of the power carrier signal can determine a transmit end of the power carrier signal based on the identification information. In some embodiments, the identification information of the controller may include one or more of the following: a logical address of the controller, a media access control MAC address of the controller, and a serial number of the controller. The logical address of the controller may be allocated to the controller in advance and is used to uniquely identify an address of the controller in the photovoltaic system. For example, when the photovoltaic system includes 100 photovoltaic modules, the inverter may allocate logical addresses to controllers in the 100 photovoltaic modules in advance. The logical addresses of the controllers in the 100 photovoltaic modules may be respectively 1 to 100.

It should be noted that usually a plurality of photovoltaic units exist in the photovoltaic system, and some or all of the plurality of photovoltaic units are all to-be-grouped photovoltaic units. In this case, controllers in all photovoltaic units participating in grouping can send power carrier signals in sequence. Before sending a power carrier signal, a controller in each photovoltaic unit can obtain a power carrier signal sent by a controller, in a photovoltaic unit, that is sending the power carrier signal.

In some embodiments, frequency bands used by controllers in different photovoltaic units for sending power carrier signals may be the same or different. In addition, a frequency band used for sending a power carrier signal may be a frequency band used by a controller in a photovoltaic unit for sending a service signal with the inverter, for example, may be 75 kilohertz (kHz) to 145 kHz. Alternatively, the frequency band may be a frequency band other than the frequency band used for sending a service signal, for example, may be 280 kHz to 300 kHz. This is not specifically limited in this embodiment of this application.

Further, a sequence in which controllers in the plurality of photovoltaic units in the photovoltaic system send power carrier signals successively may be determined based on an actual need. For example, a logical address may be allocated in advance to each controller in the photovoltaic system. In this case, the controllers in the plurality of photovoltaic units may send power carrier signals in sequence based on the logical addresses of the controllers in ascending order of the logical addresses.

Operation 202: The controller in the photovoltaic unit determines an attenuation reference factor of the power carrier signal based on the obtained power carrier signal, and sends the attenuation reference factor to the inverter.

After obtaining the power carrier signal sent by the controller in the another photovoltaic unit, the controller in the photovoltaic unit may determine the attenuation reference factor of the power carrier signal based on the obtained power carrier signal, and send the attenuation reference factor of the power carrier signal to the inverter, so that the inverter groups the plurality of photovoltaic units in the photovoltaic system based on the attenuation reference factor of the power carrier signal.

The attenuation reference factor of the power carrier signal is used to reflect an attenuation degree of signal attenuation of the power carrier signal in a process of being transmitted, to the controller that is in the photovoltaic unit and that obtains the power carrier signal, from the controller that is in the another photovoltaic unit and that is indicated by the identification information carried in the power carrier signal. In some embodiments, the attenuation reference factor may include one or more of the following: a signal strength, and a line impedance for transmitting the power carrier signal. The following describes an embodiment for obtaining the attenuation reference factor.

When the attenuation reference factor is a signal strength, the attenuation reference factor of the obtained power carrier signal may be a received strength of the power carrier signal.

In a possible embodiment of obtaining the received strength, the received strength may be represented by using a received signal strength indicator (RSSI). Correspondingly, an embodiment for obtaining the RSSI may be as follows: When the controller in the photovoltaic unit obtains the power carrier signal sent by the controller in the another photovoltaic unit, the controller in the photovoltaic unit determines the RSSI based on a signal power P of the received power carrier signal. A relationship between the signal power P and the RSSI is: $RSSI=10\times lg(P)$.

In another possible embodiment of obtaining the received strength, a signal receiving impedor for receiving a signal is disposed in the controller. When the signal receiving impedor is used to receive the power carrier signal, the power carrier signal makes the signal receiving impedor generate a voltage drop and a current, and the received strength of the power carrier signal can be determined based on at least one of the voltage drop and the current. Therefore, the received strength of the power carrier signal can be represented by using at least one of the voltage drop and the current.

When the attenuation reference factor is a line impedance for transmitting the power carrier signal, a line impedance between the controller that sends the power carrier signal and the controller that receives the power carrier signal is determined by a connection line between the controller that sends the power carrier signal and the controller that receives the power carrier signal. In addition, after deployment of the photovoltaic system is completed, a connection manner between components basically does not change. Therefore, after the deployment of the photovoltaic system is completed, statistics about line impedances between controllers are collected, and each controller stores line impedances between the controller and other controllers. Correspondingly, when a line impedance between any two controllers is to be obtained, the line impedance can be queried in either of the two controllers, to obtain the line impedance between the two controllers.

When a power carrier signal is transmitted between different controllers by using a power line, the power carrier signal consumes energy on the power line between the controllers, causing the power carrier signal to attenuate in a transmission process. Therefore, an attenuation reference factor may be a line impedance of the power line for transmitting the power carrier signal between the different controllers.

In an embodiment for determining a line impedance between different controllers, an input voltage of a controller for receiving a power carrier signal, an output voltage of a controller for sending the power carrier signal, and a current on a power line between the two controllers may be separately obtained; then, a voltage difference between the input voltage and the output voltage is obtained; and a line impedance between the two controllers is determined based on a quotient between the voltage difference and the current on the power line. The quotient between the voltage difference and the current on the power line is the line impedance between the two controllers.

Operation 203: The inverter determines, based on the attenuation reference factor, an attenuation degree of a power carrier signal obtained by a controller in each photovoltaic unit.

In a possible embodiment, when the attenuation reference factor is a signal strength (received strength), a received strength and a transmitted strength of the power carrier signal may be separately obtained, and a difference between the transmitted strength and the received strength is determined as the attenuation degree of the power carrier signal.

The inverter, the controller in the photovoltaic unit, and the controller in the another photovoltaic unit may agree on the transmitted strength of the power carrier signal in advance. In this way, after obtaining the received strength of the power carrier signal, the inverter can determine the attenuation degree of the power carrier signal based on the received strength and the agreed transmitted strength.

Alternatively, the power carrier signal sent by the controller may carry the transmitted strength of the power carrier signal. When the controller in the photovoltaic unit sends the attenuation reference factor of the power carrier signal to the inverter, the controller may further extract the transmitted strength of the power carrier signal from the power carrier signal, and send the transmitted strength of the power carrier signal to the inverter, so that the inverter determines the attenuation degree of the power carrier signal based on the received strength and the transmitted strength.

In another possible embodiment, when the attenuation reference factor is a line impedance for transmitting the power carrier signal, and the power carrier signal is transmitted between two controllers by using a power line, the power carrier signal consumes energy on a power line between the two controllers, causing the power carrier signal to attenuate in a transmission process. Therefore, a line impedance between the two controllers can be used to represent the attenuation degree of the power carrier signal transmitted between the two controllers.

In still another possible embodiment, when the attenuation reference factor includes a signal strength and a line impedance for transmitting the power carrier signal, the attenuation degree of the power carrier signal transmitted between the two controllers may be determined based on the signal strength and the line impedance. For example, a difference between a transmitted strength and a received strength of the power carrier signal transmitted between the two controllers may be obtained, and the line impedance for transmitting the power carrier signal is obtained. Then, a weighted sum of the difference and the line impedance is determined as the attenuation degree of the power carrier signal transmitted between the two controllers.

Operation 204: The inverter sorts attenuation degrees of power carrier signals that are obtained by controllers in a plurality of photovoltaic units and that are sent by a controller in a same another photovoltaic unit, or sorts attenuation degrees of power carrier signals that are obtained by a controller in a same photovoltaic unit and that are sent by controllers in a plurality of other photovoltaic units.

Controllers in a plurality of photovoltaic units in a same photovoltaic unit group are connected to each other. Therefore, when two photovoltaic units are located in a same photovoltaic unit group, a power carrier signal sent by a controller in one of the two photovoltaic units may be transmitted to a controller in the other one of the two photovoltaic units through a power line between the two photovoltaic units, so that an attenuation degree of the power carrier signal received by the controller in the other photovoltaic unit is relatively small. However, for two photovoltaic units in different photovoltaic unit groups, for a power carrier signal sent by a controller in one photovoltaic unit group to be transmitted to a controller in the other photovoltaic unit group, the power carrier signal not only may be transmitted through a power line, but also may undergo secondary coupling or distributed parameter coupling (for example, mutual inductance coupling) of the inverter. Therefore, when two photovoltaic units are located in different photovoltaic unit groups, an attenuation degree of a power carrier signal transmitted between controllers in the two photovoltaic units is relatively large. In addition, in photovoltaic units in a same photovoltaic unit group, attenuation degrees of power carrier signals transmitted between controllers in different pairs of photovoltaic units are also different. However, a difference in attenuation degrees of power carrier signals transmitted between controllers in a same photovoltaic unit group is far smaller than that in attenuation degrees of power carrier signals transmitted between controllers in different photovoltaic unit groups. Therefore, it can be learned that attenuation degrees of power carrier signals transmitted between different controllers in a same photovoltaic unit group present a relatively aggregated distribution status and that attenuation degrees of power carrier signals transmitted between controllers in different photovoltaic unit groups present a relatively dispersed distribution status.

Therefore, after obtaining attenuation degrees of signal attenuation of power carrier signals transmitted between different controllers, the inverter may sort the attenuation degrees corresponding to the controllers in different photovoltaic units; and determine, based on a distribution status presented by the plurality of attenuation degrees after the sorting, a reference threshold for distinguishing whether the photovoltaic unit and the another photovoltaic unit are located in a same photovoltaic unit group. The plurality of attenuation degrees may be sorted in descending or ascending order of the attenuation degrees. This is not specifically limited in this embodiment of this application.

The attenuation degrees corresponding to the controllers in different photovoltaic units are sorted, and the reference threshold is determined based on a result of the sorting. In this way, the reference threshold can be dynamically determined based on an actual deployment mode of the photovoltaic units in the photovoltaic system, thereby making the reference threshold more recognizable in grouping and improving accuracy in grouping the photovoltaic units based on the reference threshold.

Operation 205: The inverter determines the reference threshold based on a distribution status presented by the plurality of attenuation degrees after the sorting.

After the plurality of attenuation degrees are sorted, the reference threshold may be determined based on the distribution status presented by the plurality of attenuation degrees after the sorting, so that a photovoltaic unit group to which the photovoltaic unit belongs is determined based on the reference threshold in a subsequent grouping process. In some embodiments, clustering analysis may be performed on the attenuation degrees after the sorting, to obtain a plurality of clustered groups. Each clustered group includes at least one attenuation degree. Then, the reference threshold is determined based on an attenuation degree in a clustered group with a smallest average value of attenuation degrees (which is referred to as a smallest clustered group) and an attenuation degree in a second smallest clustered group, where the second smallest clustered group is a clustered group whose average value of attenuation degrees has a smallest difference with the average value of attenuation degrees in the smallest clustered group. For example, the average value of attenuation degrees in the smallest clustered group and that in the second smallest clustered group may be separately determined first, and an average value of the two average values is determined as a reference threshold for distinguishing between attenuation degrees in the two clustered groups. Alternatively, the reference threshold may be an adjusted value obtained by adjusting the average value of the two average values based on a pre-specified policy. The pre-specified policy may be determined based on an application requirement. For example, a value that is 1.3 times the average value of the two average values may be determined as the reference threshold. This is not specifically limited in this embodiment of this application. Alternatively, the reference threshold may be a weighted average value of a largest attenuation degree in the smallest clustered group and a smallest attenuation degree in the second smallest clustered group.

Attenuation degrees in a clustered group meet the following: For any attenuation degree in any clustered group, the clustered group has one or more other attenuation degrees whose difference with the any attenuation degree is less than a first difference threshold, and a difference between two attenuation degrees located in two different clustered groups is greater than a second difference threshold. A value of the first difference threshold and a value of the second difference threshold may be determined based on an application requirement, and the value of the first preset difference threshold and the value of the second difference threshold may be equal or unequal. This is not specifically limited in this embodiment of this application.

It should be noted that because the photovoltaic system usually has a plurality of photovoltaic units, in a grouping process, attenuation degrees in a process in which a plurality of photovoltaic units separately transmit power carrier signals to a plurality of other photovoltaic units are usually obtained first. Correspondingly, the attenuation degrees in the process in which the plurality of photovoltaic units transmit the power carrier signals to the plurality of other photovoltaic units may be separately sorted. Then, the reference threshold is determined in combination with a result of sorting corresponding to the plurality of photovoltaic units. For example, the plurality results of sorting may be analyzed by using a big data technology, to determine the reference threshold for distinguishing between different photovoltaic unit groups.

It should be further noted that the reference threshold may alternatively be pre-specified, for example, based on an empirical value. This is not specifically limited in this embodiment of this application.

Operation 206: The inverter groups the plurality of photovoltaic units based on the attenuation degree of the power carrier signal obtained by each photovoltaic unit and the reference threshold.

Attenuation degrees of power carrier signals transmitted between controllers in a plurality of photovoltaic units in a same photovoltaic unit group are relatively small. Therefore, when an attenuation degree of a power carrier signal that is obtained by a controller in a photovoltaic unit and that is sent by a controller in another photovoltaic unit is less than or equal to the reference threshold, it can be determined that the photovoltaic unit and the another photovoltaic unit belong to a same photovoltaic unit group.

After photovoltaic units included in a photovoltaic unit group are determined, information about the photovoltaic units included in the photovoltaic unit group can be recorded in the inverter, so that the inverter manages the photovoltaic unit groups based on the information. In addition, each photovoltaic unit group may have an identifier, and the controller in each photovoltaic unit has identification information. When the information about the photovoltaic units included in the photovoltaic unit groups is recorded, a plurality of photovoltaic units included in a photovoltaic unit group indicated by an identifier may be recorded, and each photovoltaic unit is indicated by the identification information of the controller in the photovoltaic unit.

It should be noted that the foregoing manner of determining photovoltaic unit groups based on the reference threshold is a possible embodiment of determining photovoltaic unit groups, but does not exclude that there may further be other grouping embodiments. For example, after sorting and clustering analysis are performed on the attenuation degrees, if distribution of the plurality of attenuation degrees presents at least two clustered groups, for a clustered group of the at least two clustered groups that has a smallest average value of attenuation degrees, an attenuation value in the clustered group that has the smallest average value is an attenuation degree of a power carrier signal transmitted between controllers in photovoltaic units belonging to a same photovoltaic unit group. Correspondingly, it can be determined that photovoltaic units corresponding to the attenuation degrees in the clustered group belong to the same photovoltaic unit group.

In addition, the process in the foregoing embodiment in which the inverter groups the photovoltaic units based on attenuation degrees of power carrier signals transmitted between different photovoltaic units is merely an example of a process of the photovoltaic unit grouping method provided in this embodiment of this application, but does not exclude that the photovoltaic unit grouping method provided in this embodiment of this application has other embodiments. For example, an execution body of the photovoltaic unit grouping method may alternatively be a controller in a photovoltaic unit. In this case, the controller may obtain attenuation degrees of power carrier signals transmitted between the controller and controllers in other photovoltaic units, sort the plurality of attenuation degrees, and then determine, based on a result of the sorting, a photovoltaic unit group to which the photovoltaic unit belongs. Alternatively, the controller may obtain an attenuation degree of a power carrier signal transmitted between a controller in another photovoltaic unit and a controller in each of a plurality of other photovoltaic units; and then determine, in combination with a result of sorting the plurality of attenuation degrees corresponding to the another photovoltaic unit, a photovoltaic unit group to which the photovoltaic unit and the another photovoltaic unit belong.

In addition, when a plurality of photovoltaic units exist in the photovoltaic system, the foregoing operation 201 to operation 206 may be performed on each photovoltaic unit, or the foregoing operation 201 to operation 206 may be performed on some of the plurality of photovoltaic units, provided that grouping of the plurality of photovoltaic units in the photovoltaic system can be implemented.

Further, as shown in FIG. 1, based on the deployment mode of the photovoltaic system, a plurality of photovoltaic units in each photovoltaic unit group are connected in series. In addition, in a same photovoltaic unit group, when more photovoltaic units are connected in series between two photovoltaic units, an attenuation degree of a power carrier signal received by one of the two photovoltaic units from the other photovoltaic unit increases. Therefore, if the foregoing operation 201 to operation 206 are to be performed on some photovoltaic units of the plurality of photovoltaic units, the some photovoltaic units may be photovoltaic units, in each photovoltaic unit group, located relatively near to a photovoltaic unit connected in series at a middlemost position between a plurality of photovoltaic units in the photovoltaic unit group. In this way, obtained attenuation degrees of power carrier signals between different photovoltaic units in a same photovoltaic unit group have better aggregation, and obtained attenuation degrees of power carrier signals between photovoltaic units in different photovoltaic unit groups have better dispersion. When the attenuation degrees are sorted and groups of photovoltaic units are determined based on a resulting of the sorting, grouping accuracy can be further improved. For example, as shown in FIG. 1, compared with performing the foregoing operation 201 to operation 206 on a photovoltaic unit A, performing the foregoing operation 201 to operation 206 on a photovoltaic unit B can further improve grouping accuracy.

In summary, this embodiment of this application provides a photovoltaic unit grouping method. In this method, an attenuation reference factor of each power carrier signal transmitted between controllers in different photovoltaic units in the photovoltaic system is obtained, and the attenuation degree of the power carrier signal obtained by the controller in each photovoltaic unit is determined based on the attenuation reference factor. The plurality of photovoltaic units are grouped based on the attenuation degree of the power carrier signal obtained by each photovoltaic unit. Compared with a related technology, this can implement automatic grouping of the photovoltaic units, and can effectively improve efficiency in grouping the photovoltaic units and improve grouping accuracy, thereby improving operation and maintenance efficiency of the photovoltaic system.

It should be noted that a sequence of the operations of the photovoltaic unit grouping method in this embodiment of this application may be appropriately adjusted, and operations may also be correspondingly added or deleted depending on a situation. All variant methods readily figured out by a person skilled in the art within the technical scope disclosed in this application shall fall within the protection scope of this application, and therefore are not described.

The following are apparatus embodiments of this application, and may be used to perform the method embodiments of this application. For details not disclosed in the apparatus embodiments of this application, refer to the method embodiments of this application.

Figure 3:
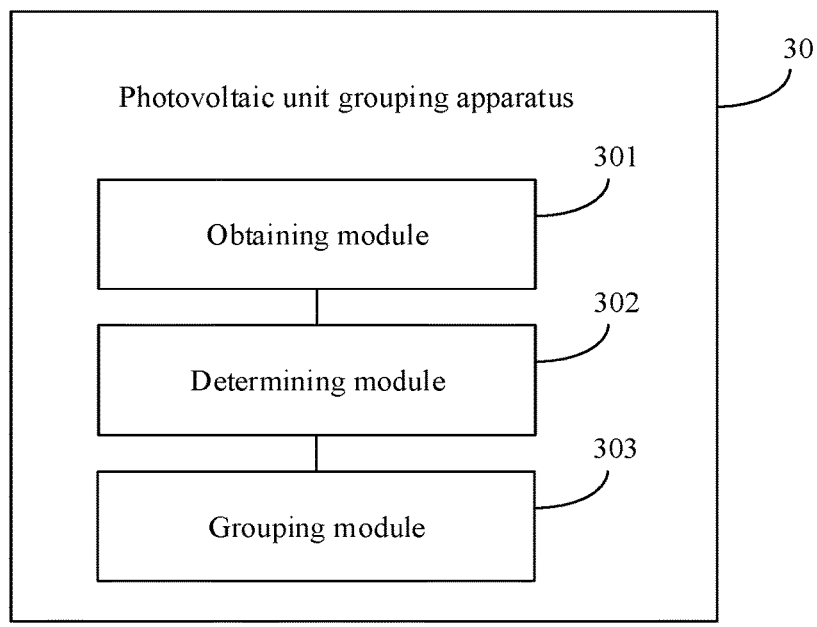
FIG. 3 is a structural block diagram of a photovoltaic unit grouping apparatus according to an embodiment of this application.

An embodiment of this application provides a photovoltaic unit grouping apparatus. As shown in FIG. 3, the photovoltaic unit grouping apparatus 30 may include:

an obtaining module 301, configured to obtain an attenuation reference factor of each power carrier signal transmitted between controllers in different photovoltaic units in a photovoltaic system, where the power carrier signal carries identification information of a controller that sends the power carrier signal, and the attenuation reference factor is used to reflect an attenuation degree of signal attenuation of the power carrier signal in a process of being transmitted, to a controller in a photovoltaic unit, from the controller that is in another photovoltaic unit and that is indicated by the identification information in the power carrier signal;

a determining module 302, configured to determine, based on the attenuation reference factor, an attenuation degree of a power carrier signal obtained by a controller in each photovoltaic unit; and a grouping module 303, configured to group a plurality of photovoltaic units based on the attenuation degree of the power carrier signal obtained by each photovoltaic unit.

In some embodiments, the grouping module 303 is configured to: when an attenuation degree of a power carrier signal that is obtained by a controller in a photovoltaic unit and that is sent by a controller in another photovoltaic unit is less than or equal to a reference threshold, determine that the photovoltaic unit and the another photovoltaic unit belong to a same photovoltaic unit group.

In some embodiments, the grouping module 303 is further configured to sort attenuation degrees of power carrier signals that are obtained by controllers in a plurality of photovoltaic units and that are sent by a controller in a same another photovoltaic unit, or sort attenuation degrees of power carrier signals that are obtained by a controller in a same photovoltaic unit and that are sent by controllers in a plurality of other photovoltaic units; and determine the reference threshold based on a distribution status presented by the plurality of attenuation degrees after the sorting.

In some embodiments, the attenuation reference factor includes one or more of the following: a signal strength, and a line impedance for transmitting the power carrier signal.

In some embodiments, the power carrier signal that is obtained by the controller in the photovoltaic unit and that is sent by the controller in the another photovoltaic unit includes at least one of the following: a power carrier signal that is sent by the controller in the another photovoltaic unit to the inverter and that is obtained through listening by the controller in the photovoltaic unit; a power carrier signal broadcast by the controller in the another photovoltaic unit; and a power carrier signal that is sent by the controller in the another photovoltaic unit to the controller in the photovoltaic unit.

In summary, this embodiment of this application provides a photovoltaic unit grouping apparatus. The obtaining module obtains the attenuation reference factor of each power carrier signal transmitted between the controllers in different photovoltaic units in the photovoltaic system. The determining module determines, based on the attenuation reference factor, the attenuation degree of the power carrier signal obtained by the controller in each photovoltaic unit. The grouping module groups the plurality of photovoltaic units based on the attenuation degree of the power carrier signal obtained by each photovoltaic unit. Compared with a related technology, this can implement automatic grouping of the photovoltaic units, and can effectively improve efficiency in grouping the photovoltaic units and improve grouping accuracy, thereby improving operation and maintenance efficiency of the photovoltaic system.

It may be clearly understood by a person skilled in the art that, for the purpose of convenient and brief description, for a detailed working process of the foregoing apparatus and module, refer to a corresponding process in the foregoing method embodiments, and details are not described herein again.

Figure 4:
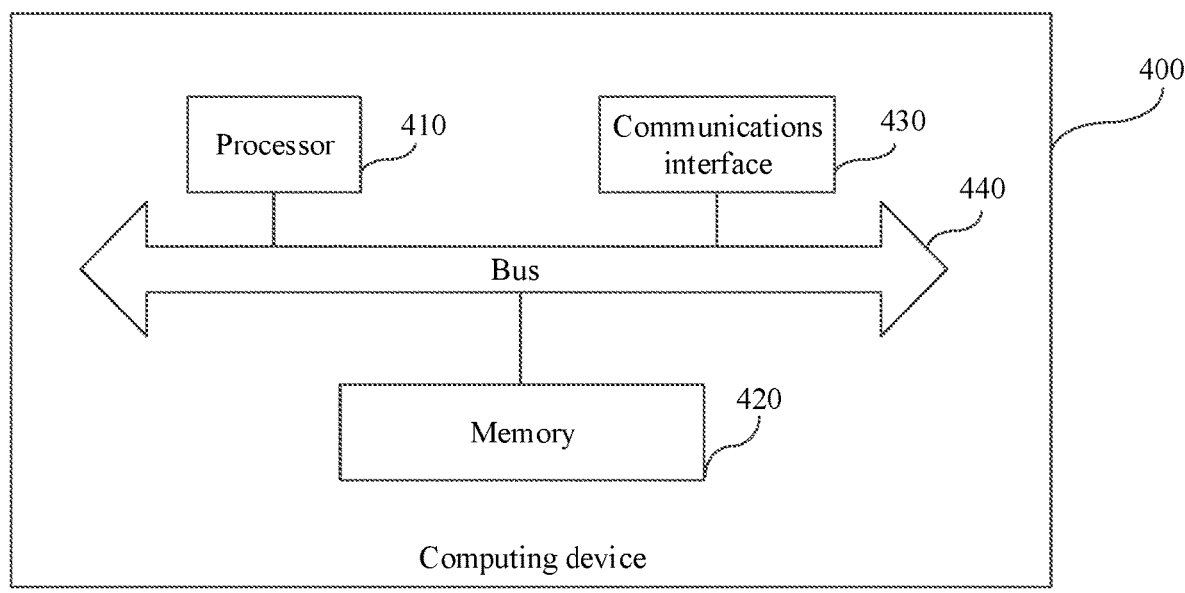
FIG. 4 is a schematic diagram of a structure of a computing device according to an embodiment of this application.

An embodiment of this application further provides a computing device. As shown in FIG. 4, the computing device 400 includes a processor 410, a communications interface 420, and a memory 430. The processor 410, the communications interface 420, and the memory 430 are connected to each other by using a bus 440.

The bus 440 may be classified into an address bus, a data bus, a control bus, and the like. For ease of representation, only one thick line is used to represent the bus in FIG. 4, but this does not mean that there is only one bus or only one type of bus.

The memory 430 may include a volatile memory, for example, a random-access memory (RAM). The memory 430 may also include a non-volatile memory, for example, a flash memory, a hard disk drive (HDD), or a solid-state drive (SSD). The memory 430 may further include a combination of the foregoing types of memories.

The processor 410 may be a hardware chip and is configured to complete the photovoltaic unit grouping method provided in the embodiments of this application. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. Alternatively, the processor 410 may be a general-purpose processor, for example, a central processing unit (CPU), a network processor (NP), or a combination of a CPU and an NP.

Correspondingly, the memory 430 is configured to store program instructions. The processor 410 calls the program instructions stored in the memory 430, and can perform one or more operations in the photovoltaic unit grouping method provided in the embodiments of this application or some optional embodiments thereof, to enable the computing device 400 to implement the photovoltaic unit grouping method provided in the foregoing method embodiment. For example, the processor 410 calls the program instructions stored in the memory 420 to enable the computing device 400 to perform the following operations: obtaining an attenuation reference factor of each power carrier signal transmitted between controllers in different photovoltaic units in a photovoltaic system, and determining an attenuation degree of a power carrier signal obtained by a controller in each photovoltaic unit based on the attenuation reference factor; and grouping a plurality of photovoltaic units based on the attenuation degree of the power carrier signal obtained by each photovoltaic unit. In addition, for a process in which the computing device 400 executes computer instructions in the memory 420 to perform the operations, correspondingly refer to corresponding descriptions in the foregoing method embodiment.

The communications interface 430 may be any one or any combination of the following components with a network access function: a network interface (for example, an Ethernet interface) or a wireless network interface card.

An embodiment of this application further provides a computer-readable storage medium. The computer-readable storage medium may be a non-transitory readable storage medium. When instructions in the computer-readable storage medium are executed by a computer, the computer is configured to perform the photovoltaic unit grouping method provided in this application. The computer-readable storage medium includes but is not limited to a volatile memory, for example, a random-access memory, or a non-volatile memory, such as a flash memory, a hard disk drive (HDD), and a solid-state drive (SSD).

This application further provides a computer program product. The computer program product includes computer instructions. When the computer instructions are executed by a computing device, the computing device executes the photovoltaic unit grouping method provided in this application.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the principle of this application should fall within the protection scope of this application.

What is claimed is:

1. A photovoltaic system comprising:
an inverter, and
a plurality of photovoltaic units connected to the inverter, the plurality of photovoltaic units comprising a plurality of controllers, wherein each photovoltaic unit of the plurality of photovoltaic units comprises a controller and one or more photovoltaic modules connected to the controller, and wherein the controller in each photovoltaic unit is configured to regulate an output status of the one or more photovoltaic modules,
wherein the plurality of controllers are configured to:
obtain a plurality of attenuation reference factors of a plurality of power carrier signals transmitted between the plurality of controllers in the plurality of photovoltaic units, the plurality of attenuation reference factors corresponding to a plurality of attenuation degrees, wherein a first power carrier signal of the plurality of power carrier signals carries first identification information of a first controller of the plurality of controllers that sends the first power carrier signal, wherein a first attenuation reference factor of the plurality of attenuation reference factors is used to reflect a first attenuation degree of the plurality of attenuation degrees of signal attenuation of the first power carrier signal in a process of being transmitted to a second controller of the plurality of controllers in a second photovoltaic unit of the plurality of photovoltaic units from the first controller that is in a first photovoltaic unit of the plurality of photovoltaic units and that is indicated by the first identification information in the first power carrier signal, and
wherein the inverter is configured to:
group the plurality of photovoltaic units based on the plurality of attenuation degrees of the plurality of power carrier signals obtained by the plurality of photovoltaic units.

2. The photovoltaic system according to claim 1, wherein the inverter is further configured to:
in response to the first attenuation degree of the first power carrier signal that are obtained by the first controller in the first photovoltaic unit and that is sent by the second controller in the second photovoltaic unit being less than or equal to a first reference threshold, determine that the first photovoltaic unit and the second photovoltaic unit belong to a same photovoltaic unit group.

3. The photovoltaic system according to claim 2, wherein the inverter is further configured to:
sort the plurality of attenuation degrees of the plurality of power carrier signals that are obtained by the plurality of controllers in the plurality of photovoltaic units and that are sent by one or more controllers in a same another photovoltaic unit, or sort the plurality of attenuation degrees of the plurality of power carrier signals that are obtained by a controller in a same photovoltaic unit and that are sent by the one or more controllers in a plurality of other photovoltaic units; and
determine the first reference threshold based on a distribution status presented by the attenuation degrees after sorting.

4. The photovoltaic system according to claim 1, wherein each of the plurality of attenuation reference factors comprises one or more of: a signal strength or a line impedance for transmitting a power carrier signal.

5. The photovoltaic system according to claim 1, wherein the first power carrier signal that is obtained by the first controller in the first photovoltaic unit and that is sent by the second controller in the second photovoltaic unit comprises at least one of:
the power carrier signal that is sent by the second controller in the second photovoltaic unit to the inverter and that is obtained through listening by the first controller in the first photovoltaic unit;
the power carrier signal broadcast by the second controller in the second photovoltaic unit; or
the power carrier signal that is sent by the second controller in the second photovoltaic unit to the first controller in the first photovoltaic unit.

* * * * *